Figure 4:
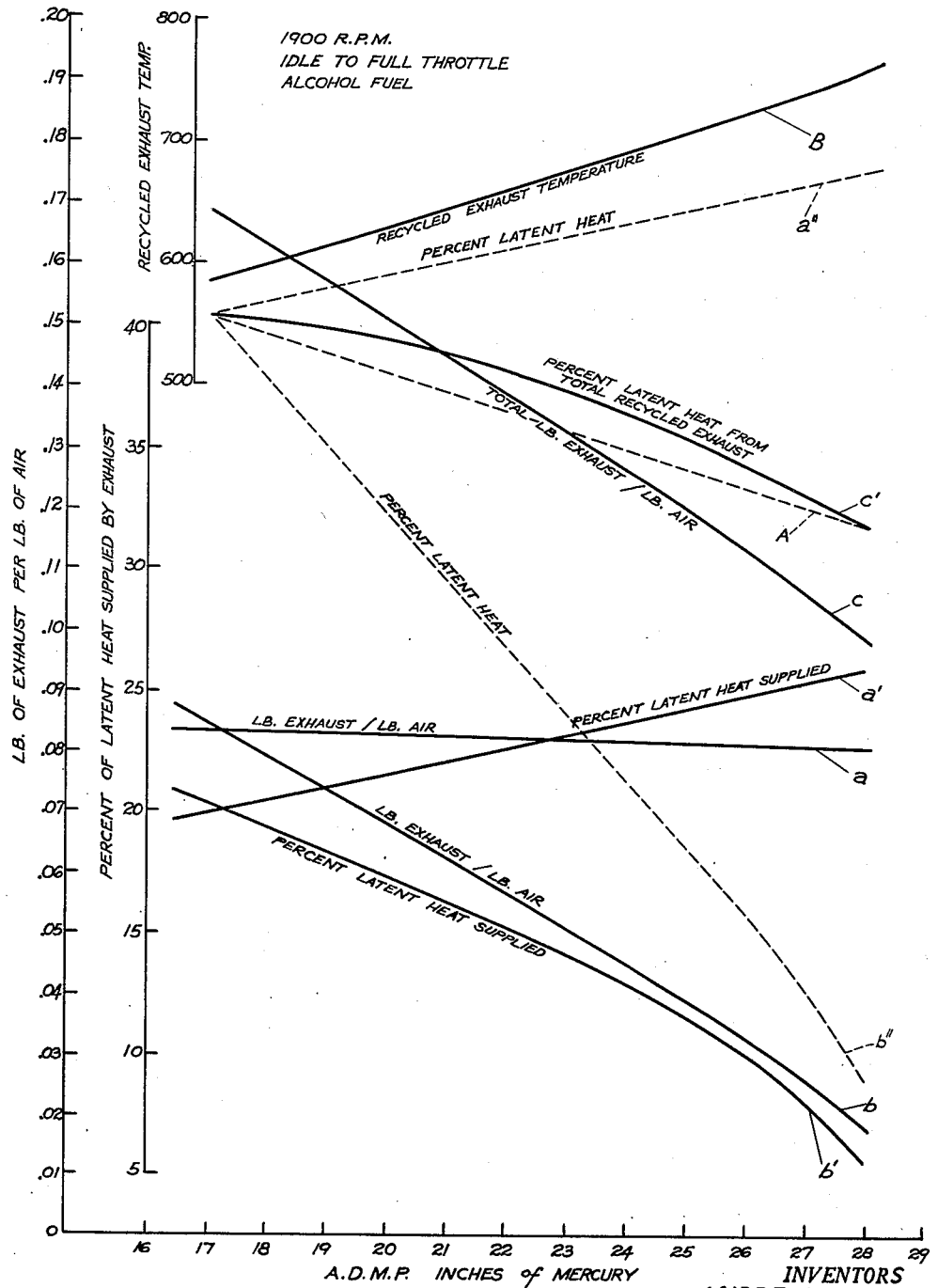

June 30, 1953
A. J. MEYER ET AL
2,643,647
MULTIFUEL CARBURETOR
Filed Aug. 3, 1948
3 Sheets-Sheet 1
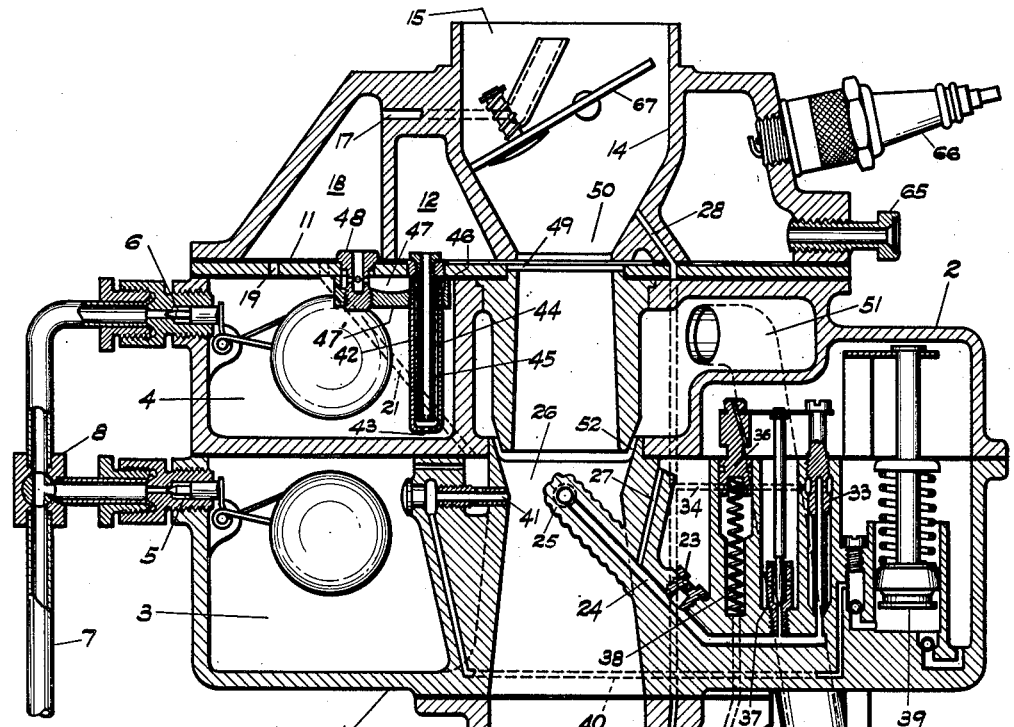
Fig. 1
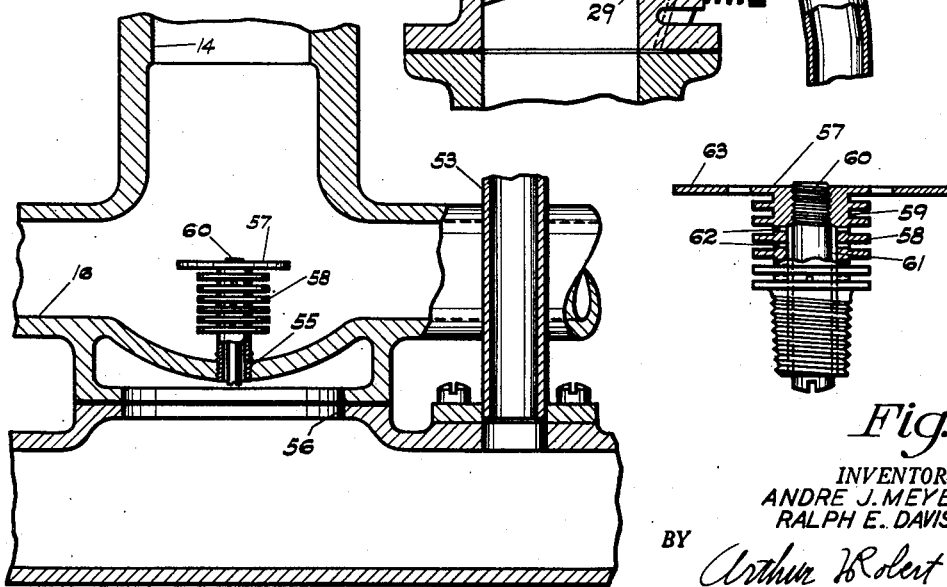
Fig. 2
Fig. 3
INVENTORS
ANDRE J. MEYER &
RALPH E. DAVIS
BY Arthur Robert
ATTORNEY INVENTOR.
ANDRE J. MEYER &
RALPH E. DAVIS
BY Arthur Robert
ATTORNEY Patented June 30, 1953

2,643,647

UNITED STATES PATENT OFFICE 2,643,647

MULTIFUEL CARBURETOR

Andre J. Meyer, Lexington, Ky., and Ralph E. Davis, Jamestown, Ind.; said Davis assignor to Joseph E. Seagram & Sons, Inc., Shively, Ky., a corporation of Indiana Application August 3, 1948, Serial No. 42,298

16 Claims. (Cl. 123—127)

The present invention relates to a fuel charge forming device, commonly known as a carburetor, for internal combustion engines.

At the present time gasoline is used extensively as a fuel for the internal combustion engines providing the motive power for farm tractors, farm lighting equipment, trucks and other apparatus. Recently, methods have been developed which enable the production of ethyl alcohol on a small scale from farm wastes, such as sawdust, fruit culls, frost bitten grains, or from surplus carbohydrate crops, so that the farmer can produce alcohol for fuel from his crops with substantially no cash outlay. Production of alcohol in this process furthermore has the advantage that only carbohydrate material is used, and the nitrogenous waste from the process can be returned to the soil as fertilizer, or can be utilized as a cattle food supplement. It is, therefore, desirable to provide for operation of such farm equipment by either gasoline or ethyl alcohol as the fuel as this will enable the farmer to use whichever fuel is advantageous to him. The use of alcohol as a fuel also is advantageous in countries deficient in petroleum resources.

Accordingly, it is an object of the present invention to provide a charge forming device which may be employed selectively for supplying a gasoline-air charge or an alcohol-air charge to an internal combustion engine.

A further object is the provision of a fuel carburetor which can be utilized for supplying a gasoline-air charge to an internal combustion engine, and which can be converted and easily adjusted for supplying a charge of some other fuel to the engine.

Still another object is to improve the charge forming efficiency of a carburetor regardless of whether gasoline or other fuel is employed.

Another object is the provision of a charge forming device for supplying heat from the engine exhaust gas to the fuel charge in the quantity required for proper operation under variable load and speed conditions.

Another object of the invention is the provision of a carburetor which improves the operating efficiency of an internal combustion engine.

Another object is the provision of a carburetor including a fuel combustion device for supplying heat to the fuel to assist starting in cold weather.

In accordance with one feature of the present invention there is provided a plurality of nozzles for introducing fuel into the air supply line of the engine at a rate dependent on the air velocity with provision for selectively shutting off the flow of fuel through at least one of said nozzles. If desired, the nozzles may be located at a common restriction in the air supply line which provides a low pressure zone, or separate restrictions may be provided. Provision may be made for cold weather starting by having an ignition chamber into which fuel is introduced by the action of the air flow and where it is ignited, and the heated products of combustion are drawn into the fuel charge by the air flow. Thus, the fuel may be introduced directly into the air stream, or some of the fuel may be introduced into the air stream by way of the ignition chamber.

Preferably, the air supply line to the engine provides a plurality of restrictions in series providing low pressure zones dependent on rate of air flow, and the fuel is introduced by suitable nozzles at said restrictions. The fuel flow to one restriction may be adjusted in the desired proper proportion to air for one type of fuel, so that by cutting out fuel flow to the other restriction the carburetor may be employed with gasoline as the fuel. The fuel flow to said other restriction may provide for a fuel enrichment of the charge, so that by allowing flow to both restrictions the proper charge is formed for some other type of fuel. By providing the restrictions in series, rather than in parallel, changes in pressure at one zone of the air supply line, as by the introduction of fuel, effects a proportionate change at the other restriction, so that by selectively allowing fuel flow to one or both restrictions the fuel charge forming device may be employed with any of a variety of fuels.

In a practical embodiment of the invention, there is provided a carburetor for supplying liquid fuel to an internal combustion engine, having plural float chambers connected to the fuel line. In connection with one float chamber provision may be made for adjusting the fuel-air ratio supplied the intake manifold for one type of fuel, as for example, for idling, cruising speeds and acceleration, and the other chamber may provide for injection of additional fuel to the intake manifold so that the two chambers supply fuel in proportion to air intake of the engine. This enables a conventional gasoline carburetor to be used as the one chamber, so that, for example, in using alcohol as the fuel, the two chambers together provide the required substantially constant fuel-air ratio at various throttle openings. The carburetor may be used alternatively for gasoline as the fuel or for alcohol or other fuels by the provision of valved connections between the fuel line and chambers, so that one or both chambers may be connected to the fuel line as desired.

In a carburetor, the atomization of the fuel is a function of the velocity of the air supply to the engine cylinders, and at restricted position of the throttle or at low engine speeds, the low air velocity results in inferior atomization compared to that obtained with the throttle in further opened position. At low air velocities the fuel atomizes in large droplets which have a tendency to precipitate out of the air stream so that the cylinders farther from the carburetor receive less fuel. This situation is not so pronounced at higher air velocities because the fuel atomizes in smaller droplets. It is, therefore, desirable to provide heat to the fuel in the proper proportion to vaporize enough fuel to offset the precipitating tendency. This is especially important in using alcohol as the fuel because alcohol has a high latent heat of vaporization compared to gasoline, and has a fixed boiling point. Under some conditions ice formation may occur in the carburetor unless heat is supplied thereto.

In accordance with another feature of the invention, as the air flow to the engine increases, heat from exhaust gas is supplied to one portion of the air stream in an increasing ratio, and to another portion in decreasing ratio. By properly proportioning heat flow to the different portions of the air stream, the overall heat per unit weight of fuel supplied to the engine may vary in substantially any desired ratio. Thus, the largest amount of heat may be supplied to the fuel at low speed, the ratio decreasing at the proper rate as the speed of the engine or its load increases. The efficiency of operation of the engine thus is promoted.

The fuel introduced to the charge bears a substantially constant ratio to the volume of gas flowing past the restriction. However, by replacing part of the air with practically inert exhaust gas and fuel vapor the oxygen content of the charge is reduced without reducing its velocity or volume, so that the fuel-oxygen ratio at the downstream nozzle increases as the throttle valve is opened wider. This increase is offset by providing a decreasing fuel-air ratio at the upstream fuel nozzle, so that the two nozzles together supply a constant fuel-air ratio.

Figure 5:
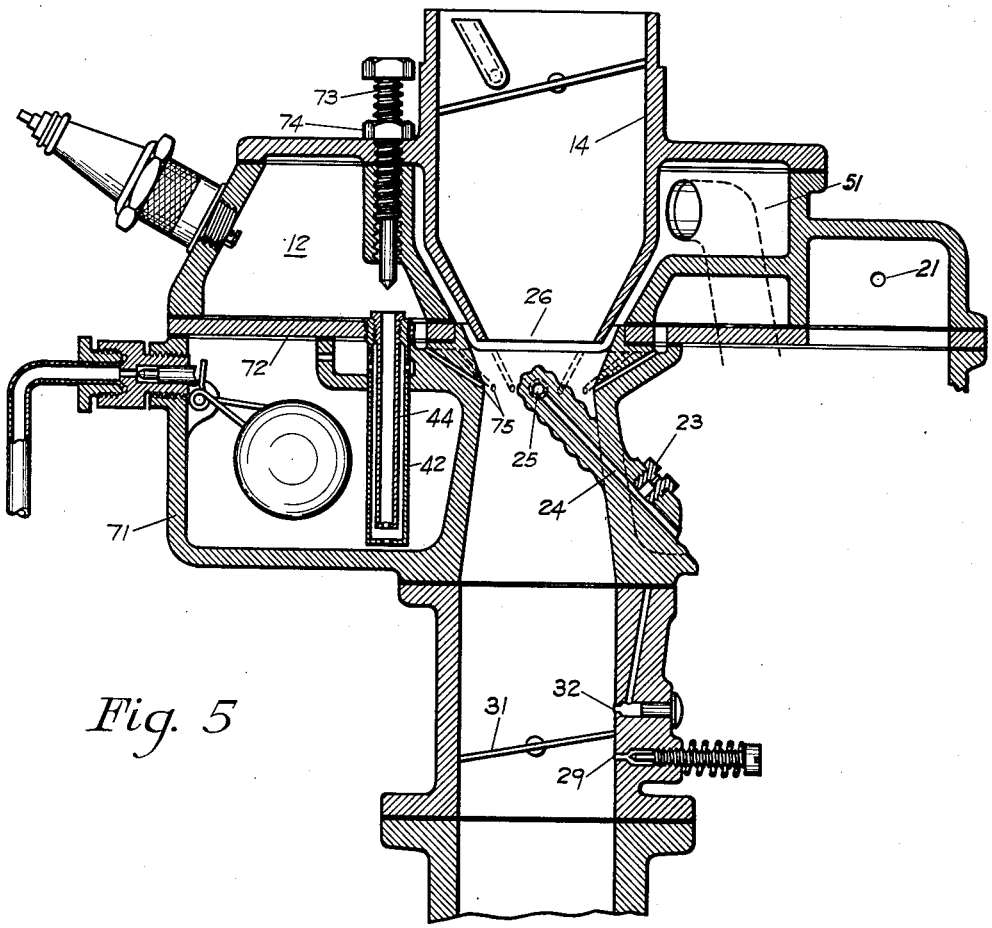

The invention will be described in greater detail in connection with the accompanying drawing where are shown preferred embodiments of the invention by way of illustration, and wherein:

Figures 1 and 2 are schematic sectional views illustrating the operating principle of a preferred embodiment of the invention, Figure 3 is a view partly in section of a detail, Figure 4 shows graphs covering certain performance conditions, and Figure 5 is a schematic view similar to Figure 1 of a modification.

Referring to the drawing, the numeral 1 indicates in general a carburetor of known construction for supplying a gasoline and air charge to a gasoline engine, the carburetor being modified for accommodation of the superstructure indicated generally at 2, to be later described in detail, and which modifies the carburetor for use with an alternative fuel, such as alcohol. Superimposed on the lower float chamber 3 is an upper float chamber 4 formed in the superstructure which provides a cover for the lower float chamber. The float chambers are supplied with fuel through float valve controlled inlets 5 and 6 connected to a common fuel line 7. As shown in the drawing, a three-way valve 8 in the fuel line may be positioned to supply fuel to the lower chamber 3 only, as where gasoline is employed as the fuel, or to both upper and lower chambers 4 and 3 respectively, when fuels requiring a different air ratio are used. The superstructure includes a cover plate 11 for the upper float chamber 4 and provides an ignition chamber 12 above the cover plate.

An air supply or charge forming conduit 14 opening to the atmosphere at 15 extends downwardly through the ignition chamber 12 and float chambers 4 and 3, and at its end the air supply conduit connects with the intake manifold 16 of the engine. A passageway 17 opening into a scoop in the air supply conduit 14 near the air inlet 15 connects with a pocket 18, which in turn connects by opening 19 in the cover plate 11 with float chamber 4 above the level of fuel therein. A conduit 21 also connects pocket 18 with the float chamber 3 above the level of fuel therein. These conduits serve to equalize the air pressures in chambers 4 and 3 with the supply air pressure, to provide against variable air supply conditions causing a change in the air-fuel ratio.

The lower chamber 3 connects through a jet orifice 23 with a conduit 24 extending through a boss and terminating at a nozzle 25 adjacent a restriction 26 in the air supply conduit 14, and an air conduit 27 in a boss connects chamber 3 above the fuel level with conduit 24. A passageway 28 extends from the air inlet to a needle valve controlled nozzle opening 29 on the downstream side of the throttle valve 31 and also connects with an opening 32 on the upstream side of the throttle valve. Conduit 24 is continued to hollow orifice fitting 33 which connects by conduit 34 with air conduit 28 to supply fuel to nozzle 29. Conduits 24, 34 and 28 provide fuel during idling operation of the engine, and valved opening 29 on the downstream side of the throttle valve provides adjustment of the air-fuel ratio for idling.

The inlet manifold pressure on the downstream side of the throttle valve, which is subatmospheric, is transmitted by conduit 35 to piston 36 which controls economizer valve 37 so that upon opening the throttle valve 31 the increase in pressure in the inlet manifold and under piston 36 allows the spring 38 to open valve 37 to admit more fuel to the conduit 24. When the throttle valve 31 is opened the aspirating effect of the air velocity at the restriction 26 in the air supply conduit draws a fuel charge from conduit 24 through atomizing nozzle 25, which is supplied to the intake manifold and is distributed to the cylinders. The carburetor includes an accelerating pump 39 connected in any suitable manner (not shown) to the throttle valve 31 so that when the throttle valve is suddenly opened fuel is pumped by conduit 40 through nozzle 41 into the air supply at restriction 26 to supply an enriched mixture to the engine during acceleration. The construction and operation of the lower fuel chamber 3 and the charge forming means as above described are known, and in the modification illustrated, the float chamber 3 is connected with the air supply line 14 through pocket 18 instead of being connected directly with the inlet of air supply line 14, in order to provide a simple and economical construction.

The upper chamber 4 provides a sleeve or well 42 extending through wall 11 and having an opening 43 at the bottom for admission of fuel from the chamber 4. A tube 44 having a restriction at the end is threaded in the sleeve 42 and extends downwardly in spaced relation to well 42 to near the bottom thereof, and thus an annular space 45 is provided therebetween. Orifices 46 in the wall of sleeve 42 connect air chamber 47, which is separated from chamber 4 by partition 47' with the annular space 45 in the well, air being supplied to the chamber 47 from pocket 18 by a suitable orifice fitting 48 threaded therein. Chamber 12 is connected by annular nozzle opening 49 with the air inlet line 14 near a restriction 50 therein. Fuel is drawn from chamber 4 through tube or nozzle 44 into chamber 12, and is introduced through nozzle opening 49 at the restriction 50 into air supply line 14. The amount of air supplied through orifices 46 may be varied by replacing fitting 42 by one having different sizes of orifices therein.

The lower section of the superstructure provides a chamber 51 which is connected to restriction 26 of passage 14 by an annular throat or nozzle opening 52. Chamber 51 is connected by a conduit 53 to the exhaust manifold 54, and may be in thermal contact with the fuel in chamber 4 to heat the fuel therein to assist in its vaporization. Thus, under certain conditions to be hereinafter explained, hot exhaust gases are drawn in and mixed with the fuel in passage 14 at restriction 26 on the upstream side of throttle valve 31 to form a charge consisting of air, fuel and some exhaust gas, to be supplied to the motor.

The inlet manifold 16 is bored and threaded at 55 to communicate with the exhaust manifold through an opening 56 therebetween, and a combined radiator and bleed fitting 57 is threaded in the bore 55. This fitting comprises a body having fins 58 with grooves 59 therebetween, and a plug 60 is threaded into an end of the body to provide an annular passageway 61. Bores 62 in the grooves 59 communicate with the passageway 61 which in turn connects with the exhaust manifold. The radiator body 57 may be surmounted by a flange 63 which may be separate or integral therewith. The radiator body 57 preferably is made of aluminum or some other good heat conducting material so that exhaust gases drawn through passageway 61 and bores 62 into the inlet manifold 16 are cooled by the radiator sufficiently to prevent ignition of the fuel charge therein. It is to be observed that the radiator 57 admits exhaust gas on the downstream side of the throttle valve 31, and conduit 53 admits exhaust gas on the upstream side of the throttle valve.

Chamber 12 has an air inlet nozzle 65 adjacent the bottom opening to the atmosphere and a spark plug 66 is secured in this chamber and is connected to a suitable source of electricity through a manually controlled switch. The air nozzle 65 is so located relative to nozzle 44 that when the engine is choked the jet of air from nozzle 65 sweeps the fuel across the electrodes of the spark plug to ignite the fuel. If desired, a gasoline primer may be employed for starting the engine in place of the embodiment illustrated. The spark plug is utilized for cold weather starting and ignites the fuel in chamber 12 to provide heat for vaporizing the fuel.

The operation of the invention now will be described. The invention is particularly adapted to forming a charge of alcohol and air and supplying it to an internal combustion engine of the gasoline burning type, and its operation will be described in connection with such a fuel charge, although not limited thereto. The lower carburetor 1 is of known type and its operation need not be described in detail. The lower carburetor is adjusted to prepare a charge of gasoline and air in the proper proportion to the engine when chamber 4 is shut off from the fuel line by valve 8. If it is desired to employ alcohol as a fuel the valve 8 is turned to the position illustrated to connect both chambers 3 and 4 to the fuel supply line 7.

An internal combustion engine operating at a given speed and load has a fixed air intake and more alcohol than gasoline on a weight basis is required to consume the air intake. The lower chamber 3 supplies a spray of alcohol to the air line 14 by nozzle 25 at approximately the same ratio to air as it would supply gasoline. However, the resulting mixture is not rich enough in alcohol for proper operation of the engine. The upper chamber 4 supplies additional alcohol mist through the nozzle opening 49 to the air intake, this alcohol being drawn upward through tube 44 into chamber 12 where it spreads over the floor of the chamber, and thence by nozzle opening 49 into the air inlet line 14, so that a proper mixture of air and alcohol is supplied to the intake manifold of the engine by both fuel nozzles. The adjustment of air flowing through nozzle 44 provides for reducing the fuel-air ratio supplied by this nozzle at higher speeds to balance the increased fuel-air ratio supplied at higher speeds at nozzle 25, because an increase in the amount of air passing through the nozzle 44 reduces the amount of fuel drawn therethrough into the air line 14. The spark plug 66 is utilized for cold weather starting and the combustion of alcohol in chamber 12 supplies heat for vaporizing the alcohol at the start.

After the engine is operating heat is supplied to the alcohol on the upstream side of throttle valve 31 from the exhaust manifold by tube 53 and chamber 51 connected by throat 52 to the air inlet line 14. Heat also is supplied to the charge by exhaust gas admitted on the downstream side of the throttle valve by the openings 62 in radiator 57. At low air velocities atomization of the fuel is inferior, and it is necessary to supply heat to the fuel charge to vaporize some of the fuel and prevent precipitation of the fuel particles from the charge in the intake manifold with consequent poor distribution of fuel to the cylinders. However, under greater loads the air velocity is higher so that atomization of the fuel is better, and the fuel particles stay in suspension better, and less heat for vaporization is required to keep the fuel from precipitating in the intake manifold. Supplying an excess of exhaust gas over that required to provide the needed heat results in lower engine efficiency and lower power output, while a deficiency of heat results in poor engine operation and may cause icing in the carburetor.

When the engine is operating at low speed with the throttle valve 31 restricted, a high vacuum is attained in the air line 14 on the downstream side of the throttle valve, so that the largest volume of exhaust gas is drawn through radiator 57 into the charge. As the throttle valve opens wider the vacuum in line 14 on the downstream side of the throttle reduces and less exhaust gas is drawn in, and even though the temperature of the exhaust gas increases, the heat per fuel unit supplied through radiator 57 decreases at too rapid a rate for efficient operation. A slightly decreasing proportion of exhaust gas to fuel is drawn into the charge at the throat 52 on the upstream side of the throttle valve as the air flow increases, and as the exhaust temperature increases with increase of air flow, more and more heat is supplied to the charge from this connection, so that an excessive amount of heat is supplied to the charge from connection 53. However, by suitably proportioning the effective areas of exhaust gas openings 52 and 62 the desired ratio of exhaust gas to fuel may be obtained for all operating conditions.

The cooperation of conduits 53 and 61 in admitting exhaust heat in the proper proportion will be explained in connection with the accompanying graphs shown in Figure 4. Curve A may be regarded as a typical curve representing the proportion of latent heat required to be supplied to the charge by exhaust gas heat. Curves $a$ and $b$ represent the variations in exhaust-air ratio with variations in absolute dry manifold pressure when operating at constant speed under varying load conditions, curve $a$ being taken with inlet manifold 16 disconnected from exhaust manifold 54 except through tube 53, and curve $b$ being taken with the inlet manifold disconnected from the exhaust manifold except through radiator 57. Referring to curve $a$, it will be seen that the proportion of exhaust gas supplied at the throat 52 per pound of air is practically constant at all rates of air or fuel flow. This is because the flow through nozzle 52 of fixed area is proportional to the static pressure differences in the exhaust manifold and the throat 26. Thus, the greater the air flow the greater is the static pressure of the exhaust gas, and the smaller is the static pressure at the throat 26, so that the flow of exhaust gas into the charge increases at substantially the same rate as the air flow. However, the temperature of the exhaust gas rises with increased fuel and air supply, as shown by curve B, so that the heat supplied to the charge by nozzle 52 increases with increased air flow. If the area of throat 52 or conduit 53 is selected to supply entirely the desired heat at restricted throttle position, the heat supplied at wider open throttle positions will always be in ever increasing excess of the requirements, as shown by curve $a''$.

Considering now curve $b$, the flow of exhaust gas from the exhaust manifold to the intake manifold by orifices 62 depends on the differences in static pressure between the exhaust manifold and intake manifold. At low rates of air flow the intake manifold pressure is low (subatmospheric) and the exhaust manifold pressure is always slightly above atmospheric pressure. As the air flow increases the pressure in the intake manifold rises faster than the exhaust pressure rises, and thus the flow of exhaust gas into the intake manifold rapidly falls off. The flow falls off so rapidly that the heat supplied by the exhaust gas flow also falls off as shown by curve $b'$ in spite of the increasing temperature thereof. This curve $b'$ always approaches zero at wide open throttle, and if the area of orifices 62 were selected to give entirely the desired heat input at restricted throttle position the curve would follow substantially line $b''$ so that the heat supplied will be in ever increasing deficiency. Thus, too little heat would be supplied to the fuel charge at all positions of the throttle other than at restricted position. However, by suitably proportioning the area of orifices 62 to the area of throat 52 (or conduit 53) the resultant curve $c'$ may be made to coincide with curve A at two selected points, which may be the idling and full open throttle positions, or any other two points, because curve $c'$ may be made to assume an intermediate position between curve $a''$ and $b''$. Then, all other points on the resultant curve $c'$ will approximate the required proportion of heat to fuel for various throttle positions as required for curve A. If desired, conduits 53 and 61 may each have a suitable valve for controlling their effective areas, or both of these conduits may connect into a common exhaust gas conduit and may be controlled by a double valve which reduces the effective area of one while enlarging the effective area of the other.

An engine designed for operation on either gasoline or alcohol should have a compression ratio of about 7.35 for best results as this is about the top limit for commercial automobile gasoline treated with tetraethyl lead, and gives comparable efficiencies using alcohol as the fuel. Also, when employing recycled exhaust gas and alcohol as fuel the optimum sparks' advance generally should be greater than employed with gasoline, depending on the particular design of engine.

In the modifiction shown in Figure 5, wherein like parts are designated by like numerals, the float chamber 71, which contains the accelerator pump, fuel economizer valve, etc. of chamber 3, has a cover plate 72 in which is located the nozzle 44 opening into ignition chamber 12. The upper wall of the ignition chamber is bored and threaded to receive a needle valve 73 which is employed to close nozzle or tube 44 when the carburetor is employed for gasoline. A lock nut 74 holds the needle valve in closed or open position as desired. When the carburetor is to be used for a fuel other than gasoline the needle valve 73 is opened so as to admit fuel into the ignition chamber 12. Chamber 12 is connected by a sump and a series of nozzle openings 75 to the throat or restriction 26 in air line 14 so that the fuel which spreads over the floor of chamber 12 is supplied thereby to the air line. Except for the differences in construction above pointed out, this embodiment is constructed and operates substantially the same as that shown in Figures 1 to 3. If desired the ignition chamber 12 may be omitted, in which case the nozzle 44 may open directly into the restriction 26 and may be supplied with a suitable valve, or may connect with a sump connected by nozzle openings 75 with the restriction.

The carburetor herein disclosed embodies the practical operating efficiencies of a gasoline carburetor, and is readily changed over into an alcohol carburetor, with retention of the operating efficiency. In addition, the efficiency of the carburetor is enhanced by supplying exhaust gas heat to the fuel charge at the proper descending ratios to maintain efficient distribution of fuel to the engine cylinders at all rates of fuel flow.

We claim as our invention:

1. A liquid fuel carburetor for an internal combustion engine comprising: a fuel charge forming conduit having an opening for admission of air, and adapted to be connected to the engine, said conduit having means for aspirating fuel to produce a fuel charge: a throttle valve between said means and the engine to control the fuel supplied to the engine; means on the upstream side of said throttle valve for producing a low pressure zone responsive to air velocity; a conduit adapted to connect said zone with the exhaust line to the engine for introducing exhaust gas; and a second conduit communicating between said fuel charge forming conduit on the opposite side of said throttle valve and the exhaust line of the engine for introducing exhaust gas.

2. A liquid fuel carburetor for an internal combustion engine comprising: a housing providing a pair of fuel supply chambers; a fuel charge forming duct having a pair of restrictions arranged in series therein; means connecting said restrictions with said supply chambers respectively for drawing fuel from said chambers; means for supplying exhaust gas to said charge forming duct at a rate proportional to the velocity of air flow therethrough; and means for supplying exhaust gas to said duct at a rate inversely dependent on the static pressure in said duct.

3. A carburetor as specified in claim 2 having a throttle valve in the fuel charge forming duct, and wherein said exhaust gas supply means are connected on the upstream and downstream sides respectively of the throttle valve.

4. In a liquid fuel carburetor for internal combustion engines: a fuel charge forming conduit having means for providing a low pressure zone dependent on rate of air flow; nozzle means for supplying fuel to said conduit at said means; means for supplying exhaust gas to said conduit at a rate proportional to the velocity of air flow through said conduit and means for simultaneously supplying exhaust gas to said conduit at a rate inversely dependent on the static pressure in said conduit.

5. The method of forming a fuel charge for an internal combustion engine which comprises: introducing a spray of fuel into an air stream; introducing exhaust gas into the air stream at one zone at a rate substantially proportional to the air velocity; and simultaneously introducing exhaust gas into the air stream at another zone at a rate varying inversely with the static pressure of the air stream.

6. The method of forming a fuel charge for an internal combustion engine which comprises: introducing a spray of fuel into an air stream passing through a conduit having a throttle valve therein to control the flow therethrough; introducing exhaust gas from the engine into the air stream upstream of the throttle valve at a rate proportional to the air velocity in the conduit; and introducing exhaust gas from the engine into the air stream in a zone downstream of the throttle valve at a rate inversely proportional to the static pressure of the air stream in said zone.

7. In a carburetor for an internal combustion engine: a fuel charge forming conduit having an opening for admission of air, and adapted to be connected to the engine; means communicating with said conduit for introducing a fuel charge therein; a throttle valve in said conduit between said means and said engine; means adapted to be connected to the engine exhaust for introducing exhaust gas into said conduit on the upstream side of said throttle valve; and means adapted to be connected to the engine exhaust for introducing exhaust gas into said conduit on the downstream side of said throttle valve.

8. In a carburetor for an internal combustion engine, a fuel charge forming conduit for admission of air to the engine and having at least one restriction therein providing a low static pressure zone; a float controlled chamber for liquid fuel; nozzle means connecting said chamber with a low static pressure zone in said conduit for introducing fuel thereto; a second float controlled chamber for liquid fuel; a common supply conduit for said chambers; valve means for selectively stopping flow of fuel to one of said chambers; a third chamber above the second chamber and having nozzle means connected to a low static pressure zone in said conduit; and a combined air and fuel lift nozzle for transferring fuel from the second chamber to the third chamber.

9. A carburetor as specified in claim 8 having an igniter in the third chamber above the liquid therein.

10. In a carburetor for an internal combustion engine: a fuel charge forming conduit having an opening for admission of air, and adapted to be connected to the engine intake, said conduit having at least one restriction providing a low static pressure zone therein; a supply chamber for liquid fuel; a second chamber above the first chamber and connected by a restricted passageway to said low static pressure zone to develop a suction pressure in said second chamber; an open tube extending from said second chamber below the level of liquid in said supply chamber; and an open jacket surrounding said tube; the space between said jacket and tube being connected to the atmosphere, whereby a spray of air and liquid fuel is drawn into said second chamber through the tube.

11. A carburetor as specified in claim 10 wherein the connection of the space between the jacket and tube to the atmosphere is a passageway opening into said conduit to provide air pressure therein proportional to the air velocity in the conduit.

12. In a carburetor for an internal combustion engine: a fuel charge forming conduit for admission of air to the engine; a supply chamber for liquid fuel; a second chamber above the supply chamber; nozzle means for injecting fuel from the second chamber into said conduit; a combined air and fuel lift for transferring fuel from the supply chamber to the second chamber; a throttle valve in said conduit; means adapted to be connected to the engine exhaust for introducing exhaust gas into said conduit on the upstream side of said throttle valve; and means adapted to be connected to the engine exhaust for introducing exhaust gas into said conduit on the downstream side of said throttle valve.

13. A carburetor as specified in claim 12 wherein said latter means comprises a perforate heat radiator.

14. In a carburetor for an internal combustion engine: a fuel charge forming conduit for admission of air to the engine and having at least one restriction therein providing a low static pressure zone; a first level controlled chamber for liquid fuel; means connecting said chamber to a low static pressure zone in said conduit; a second level controlled chamber for liquid fuel separate from the first chamber; a third chamber providing a vapor space and an accumulating floor therein for liquid fuel, said second chamber being connected adjacent the accumulating floor to a low static pressure zone in the conduit to supply fuel to said conduit; means for transferring a fuel spray from the second chamber to the third chamber, and pressure equalization conduits connecting the third chamber to said first and second chambers.

15. In a carburetor for an internal combustion engine: a fuel charge forming conduit for admission of air to the engine and having a pair of spaced restrictions therein providing low static pressure zones; means communicating with the downstream one of said low static pressure zones for introducing a fuel charge to said conduit; means communicating with the upstream one of said low static pressure zones for introducing a fuel charge to said conduit; and means for introducing a fuel charge to said conduit; and means for introducing exhaust gas from the engine between said restrictions whereby the air velocity at the upstream restriction is reduced.

16. A carburetor as specified in claim 15 having a throttle valve downstream of said downstream low static pressure zone, and means for introducing exhaust gas from the engine downstream of said throttle valve.

ANDRE J. MEYER.
RALPH E. DAVIS.

References Cited in the file of this patent

UNITED STATES PATENTS

| Number | Name | Date |
|---|---|---|
| 1,345,378 | Lucke et al. | July 6, 1920 |
| 1,423,482 | Higgins | July 18, 1922 |
| 1,470,659 | Westerfield | Oct. 16, 1923 |
| 1,657,293 | Woolson | Jan. 24, 1928 |
| 1,687,918 | Woolson | Oct. 16, 1928 |
| 1,829,875 | Ross | Nov. 3, 1931 |
| 1,901,847 | Moore | Mar. 14, 1933 |
| 1,920,174 | Harris | Aug. 1, 1933 |
| 1,948,702 | Ensign et al. | Feb. 27, 1934 |
| 2,047,743 | Moore | July 14, 1936 |
| 2,069,642 | Briggs | Feb. 2, 1937 |
| 2,196,536 | Rector | Apr. 9, 1940 |
| 2,258,486 | Firth et al. | Oct. 7, 1941 |
| 2,346,711 | Stupecky | Apr. 18, 1944 |
| 2,349,676 | Pratt | May 23, 1944 |

FOREIGN PATENTS

| Number | Country | Date |
|---|---|---|
| 510,040 | Great Britain | July 26, 1935 |